(12) United States Patent
Su

(10) Patent No.: US 12,510,790 B2
(45) Date of Patent: Dec. 30, 2025

(54) ARRAY SUBSTRATE, DRIVING METHOD THEREOF, DISPLAY PANEL, AND DISPLAY APPARATUS

(71) Applicants: Beijing BOE Display Technology Co., Ltd., Beijing (CN); BOE Technology Group Co., Ltd., Beijing (CN)

(72) Inventor: Qiujie Su, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/703,944

(22) PCT Filed: Jul. 20, 2023

(86) PCT No.: PCT/CN2023/108400
§ 371 (c)(1),
(2) Date: Apr. 23, 2024

(87) PCT Pub. No.: WO2025/015606
PCT Pub. Date: Jan. 23, 2025

(65) Prior Publication Data
US 2025/0231449 A1 Jul. 17, 2025

(51) Int. Cl.
*G02F 1/1362* (2006.01)
*G09G 3/36* (2006.01)

(52) U.S. Cl.
CPC ..... *G02F 1/136286* (2013.01); *G09G 3/3614* (2013.01); *G09G 3/3648* (2013.01);
(Continued)

(58) Field of Classification Search
CPC ......... G09G 3/3614; G09G 2300/0426; G09G 3/3677; G09G 3/3688
See application file for complete search history.

(56) References Cited

U.S. PATENT DOCUMENTS 12,190,778 B1 * 1/2025 He ................. G09G 3/2074
12,276,886 B2 * 4/2025 Lv ................. G02F 1/136209
(Continued)

FOREIGN PATENT DOCUMENTS

CN      101738800 A     6/2010
CN      102707524 A    10/2012
(Continued)

*Primary Examiner* — Van N Chow
(74) *Attorney, Agent, or Firm* — Workman Nydegger

(57) ABSTRACT

Provided are an array substrate, a driving method thereof, a display panel, and a display apparatus. The array substrate includes: pixel groups including two sub-pixels arranged in column direction, each column of pixel groups including sub-pixels of display colors set alternately, each sub-pixel in same row having same display color; data line groups including a first, second data lines extending in column direction, each column of pixel groups corresponding to one data line group, the first, second data lines in each data line group on opposite sides of each column of pixel groups in row direction; the first data line electrically connected to one sub-pixel in each pixel group of corresponding column, the second data line electrically connected to other sub-pixel in each pixel group; scan lines electrically connected to sub-pixels in corresponding rows, each row of scan line and each row of pixel groups arranged alternately in column direction.

16 Claims, 9 Drawing Sheets

(52) U.S. Cl.
CPC ............... *G09G 2300/0452* (2013.01); *G09G 2310/0251* (2013.01); *G09G 2310/08* (2013.01); *G09G 2320/0233* (2013.01); *G09G 2320/0242* (2013.01)

(56) References Cited

U.S. PATENT DOCUMENTS

| | | | | |
|---|---|---|---|---|
| 2015/0162350 | A1* | 6/2015 | Chen | G02F 1/136286 |
| | | | | 438/151 |
| 2021/0057449 | A1* | 2/2021 | Wang | H10D 86/441 |

FOREIGN PATENT DOCUMENTS

| | | | |
|---|---|---|---|
| CN | 102879962 | A | 1/2013 |
| CN | 103163697 | A | 6/2013 |
| CN | 104820325 | A | 8/2015 |
| CN | 105225649 | A | 1/2016 |
| CN | 106707648 | A | 5/2017 |
| CN | 111162114 | A | 5/2020 |
| CN | 111243441 | A | 6/2020 |
| CN | 111446262 | A | 7/2020 |
| CN | 112331157 | A | 2/2021 |
| CN | 114582300 | A | 6/2022 |
| CN | 114677971 | A | 6/2022 |
| CN | 115903326 | A | 4/2023 |
| KR | 20170029766 | A | 3/2017 |

\* cited by examiner

ARRAY SUBSTRATE, DRIVING METHOD THEREOF, DISPLAY PANEL, AND DISPLAY APPARATUS

CROSS-REFERENCE TO RELATED APPLICATIONS

This application is a National Stage of International Application No. PCT/CN2023/108400, filed Jul. 20, 2023, which is hereby incorporated by reference in its entirety.

TECHNICAL FIELD

The present disclosure relates to the technical field of display, in particular to an array substrate, a driving method thereof, a display panel, and a display apparatus.

BACKGROUND

A thin film transistor liquid crystal display, TFT-LCD has characteristics of being small in size, low in power consumption, high in picture quality, free of radiation, easy to carry, etc., and has been developed rapidly in recent years and gradually replaced a traditional cathode ray tube, CRT display, occupying a dominant position in the current flat panel display market. Currently, the TFT-LCD has been widely applied to a variety of large, medium and small-sized products, almost covering main electronic products in today's information society, such as LCD TVs, high-definition digital TVs, computers (desktops and laptops), cell phones, tablet personal computers, navigators, in-vehicle displays, projection displays, camcorders, digital cameras, electronic watches, calculators, electronic instruments, meters, public displays, virtual displays, etc.

SUMMARY

Embodiments of the present disclosure provide an array substrate, a driving method thereof, a display panel, and a display apparatus, and a specific scheme is as follows.

An array substrate provided by an embodiment of the present disclosure includes:
  a plurality of pixel groups arranged in a row direction and a column direction in an array mode, each pixel group including two sub-pixels arranged in the column direction, each column of pixel groups including a plurality of sub-pixels of a plurality of display colors set alternately, and each sub-pixel located in the same row having the same display color;
  a plurality of data line groups, each data line group including a first data line and a second data line extending in the column direction, each column of pixel groups corresponding to one data line group, and the first data line and the second data line in each data line group being located on two opposite sides of each column of pixel groups in the row direction respectively; wherein the first data line in each data line group is electrically connected to one sub-pixel in each pixel group of a corresponding column, and the second data line in each data line group is electrically connected to the other sub-pixel in each pixel group of the corresponding column; and
  a plurality of rows of scan lines, each row of scan line and each row of pixel groups being arranged alternately in the column direction, and the scan lines being electrically connected to the sub-pixels in corresponding rows.

In a possible implementation, in the above array substrate provided by the embodiment of the present disclosure, each row of sub-pixels is electrically connected to the scan line most adjacent thereto.

In a possible implementation, in the above array substrate provided by the embodiment of the present disclosure, each sub-row of sub-pixels in the pixel groups located in an $N^{th}$ row is electrically connected to the scan line most adjacent thereto, the pixel groups located in an $(N+1)^{th}$ row include a first sub-row of sub-pixels and a second sub-row of sub-pixels, the first sub-row of sub-pixels is electrically connected to the scan line most adjacent to the second sub-row of sub-pixels, and the second sub-row of sub-pixels is electrically connected to the scan line most adjacent to the first sub-row of sub-pixels; wherein N is a positive integer.

In a possible implementation, in the above array substrate provided by the embodiment of the present disclosure, two most adjacent sub-pixels located on two sides of the same scan line and in the same column are connected to the same data line.

In a possible implementation, in the above array substrate provided by the embodiment of the present disclosure, each row of pixel groups is electrically connected to the same row of scan line, and different rows of pixel groups are electrically connected to different rows of scan lines.

In a possible implementation, in the above array substrate provided by the embodiment of the present disclosure, each column of pixel groups includes first sub-pixels, second sub-pixels, and third sub-pixels sequentially arranged in the column direction, the display color of the first sub-pixels is blue, the display color of the second sub-pixels is green, and the display color of the third sub-pixels is red.

Each first sub-pixel in the pixel groups located in an $M^{th}$ column is alternately electrically connected to the first data line and the second data line of the corresponding group, and each first sub-pixel in the pixel groups located in an $(M+1)^{th}$ column is electrically connected to the first data line of the corresponding group.

Each second sub-pixel in the pixel groups located in the $M^{th}$ column is electrically connected to the second data line of the corresponding group, and each second sub-pixel in the pixel groups located in the $(M+1)^{th}$ column is alternately electrically connected to the second data line and the first data line of the corresponding group.

Each third sub-pixel in the pixel groups located in the $M^{th}$ column is electrically connected to the first data line of the corresponding group, and each third sub-pixel in the pixel groups located in the $(M+1)^{th}$ column is electrically connected to the second data line of the corresponding group. M is a positive integer.

In a possible implementation, the above array substrate provided by the embodiment of the present disclosure further includes a plurality of rows of common electrode lines, and each row of common electrode line is located between two rows of sub-pixels of a corresponding row of pixel groups.

In a possible implementation, in the above array substrate provided by the embodiment of the present disclosure, the common electrode lines and the scan lines are arranged alternately in the column direction.

In a possible implementation, in the above array substrate provided by the embodiment of the present disclosure, one sub-pixel in one of any two adjacent pixel groups in the column direction has the same display color as one sub-pixel in the other group, and any two adjacent sub-pixels in the column direction have different display colors.

In a possible implementation, in the above array substrate provided by the embodiment of the present disclosure, each column of sub-pixels is divided into a plurality of pixel units sequentially arranged in the column direction Y. Each pixel unit includes a first sub-pixel, a second sub-pixel, and a third sub-pixel sequentially arranged in the column direction. The first sub-pixels, the second sub-pixels, and the third sub-pixels have different display colors.

In a possible implementation, in the above array substrate provided by the embodiment of the present disclosure, the display color of the first sub-pixels is blue, the display color of the second sub-pixels is green, and the display color of the third sub-pixels is red.

In a possible implementation, in the above array substrate provided by the embodiment of the present disclosure, a length of each sub-pixel in the row direction is greater than a length of the same in the column direction.

In a possible implementation, in the above array substrate provided by the embodiment of the present disclosure, each sub-pixel includes a pixel electrode and a thin film transistor. A gate of each transistor is electrically connected to the corresponding scan line. A first electrode of each transistor is electrically connected to the corresponding data line. A second electrode of each transistor is electrically connected to the corresponding pixel electrode.

Accordingly, an embodiment of the present disclosure further provides a display panel, including the above array substrate provided by the embodiment of the present disclosure, and an opposite substrate aligned with the array substrate.

Accordingly, an embodiment of the present disclosure further provides a display apparatus, including the above display panel provided by the embodiment of the present disclosure.

Accordingly, an embodiment of the present disclosure further provides a driving method of an array substrate, used for driving the above array substrate provided by the embodiment of the present disclosure. The driving method includes:

loading scan voltages to scan lines within time of one frame, and loading data voltages to a corresponding row of sub-pixels through a data line group; wherein polarities of voltages loaded on a first data line and a second data line in each data line group are opposite, and polarities of voltages loaded on two columns of data lines between two adjacent columns of pixel groups are the same.

In a possible implementation, in the above driving method provided by the embodiment of the present disclosure, the scan voltages are loaded to the scan lines row by row within time of one frame, or the scan voltages are loaded to two adjacent rows of scan lines simultaneously.

DETAILED DESCRIPTION

Figure 1:
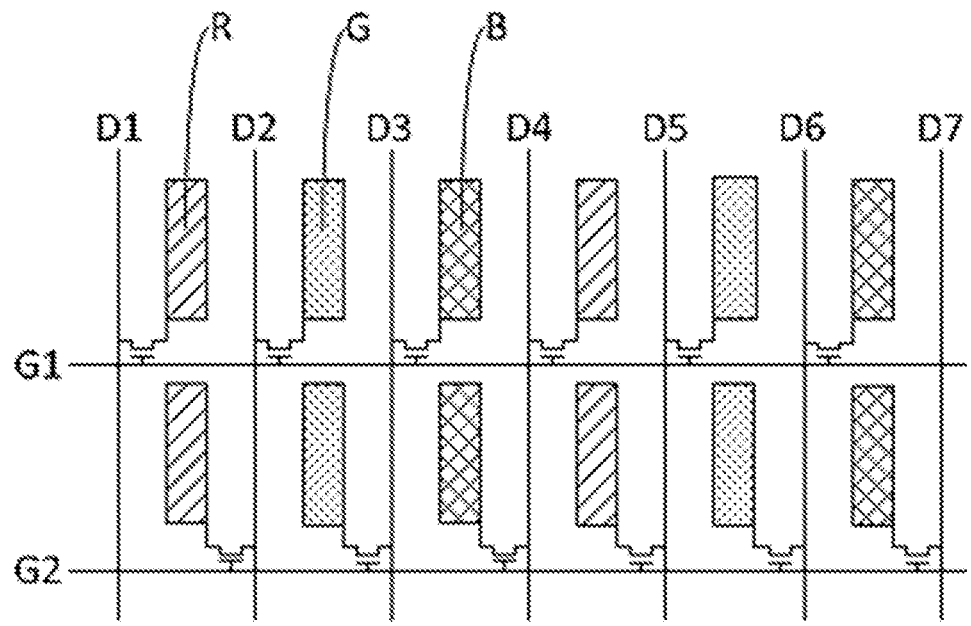
FIG. 1 is a schematic structural diagram of an array substrate provided in the related art.

To make objectives, technical solutions and advantages of embodiments of the present disclosure clearer, the technical solutions of the embodiments of the present disclosure will be clearly and completely described below in conjunction with accompanying drawings of the embodiments of the present disclosure. Apparently, the described embodiments are a part of the embodiments of the present disclosure, not all of the embodiments. In addition, the embodiments in the present disclosure and features in the embodiments may be combined with one another in the case of not conflicting. Based on the described embodiments of the present disclosure, all other embodiments obtained by those of ordinary skill in the art without creative work shall fall within the protection scope of the present disclosure.

Unless otherwise defined, technical or scientific terms used in the present disclosure shall have the common meanings as understood by those of ordinary skill in the art to which the present disclosure pertains. "Include" or "contain" or other similar words used in the present disclosure indicate that an element or item appearing before such word covers listed elements or items appearing after the word and equivalents thereof, and does not exclude other elements or items. "Connect" or "connected" or other similar words are not limited to a physical or mechanical connection, but may include an electrical connection, whether direct or indirect. "Inner", "outer", "upper", "lower" and the like are only used for representing relative position relationships, and the relative position relationships may also change accordingly after an absolute position of a described object is changed.

It needs to be noted that sizes and shapes of all figures in the accompanying drawings do not reflect true scales, and are only intended to schematically illustrate the content of the present disclosure. In addition, the same or similar reference numerals represent the same or similar elements or elements with the same or similar functions all the time.

Figure 2:
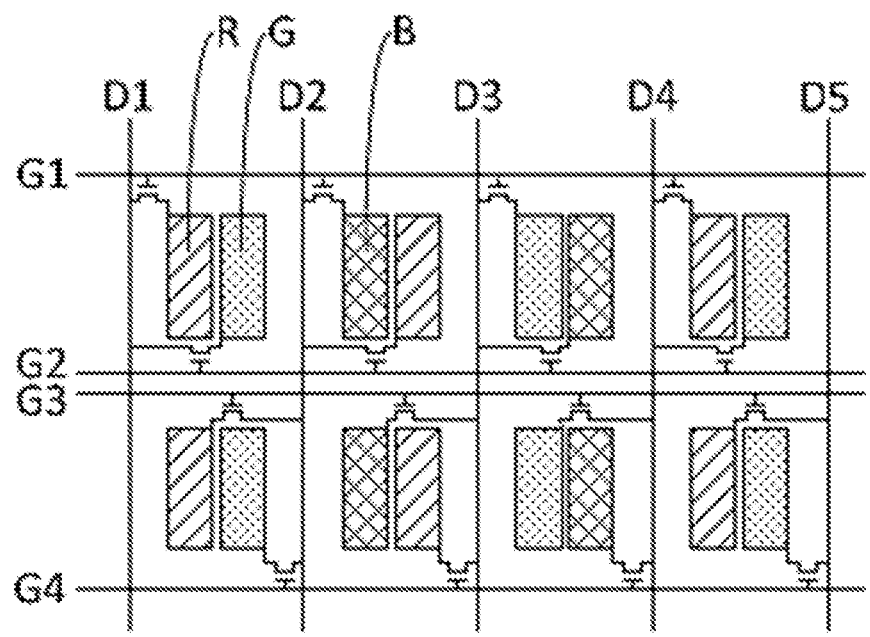
FIG. 2 is a schematic structural diagram of another array substrate provided in the related art.
Figure 3:
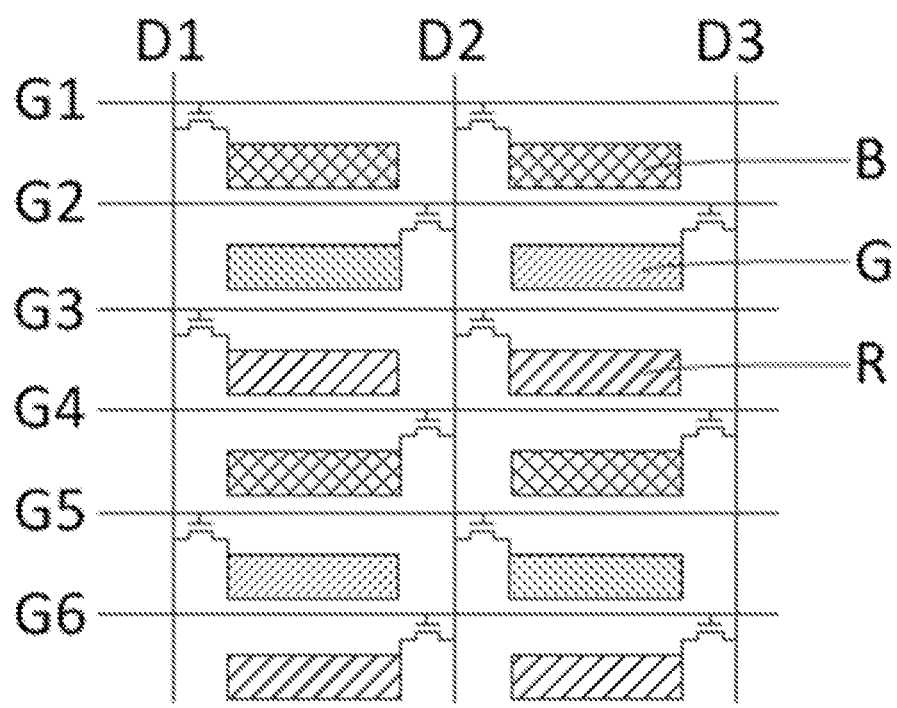
FIG. 3 is a schematic structural diagram of another array substrate provided in the related art.

Currently, commonly used pixel architectures are Single Gate (each row of pixel units is driven by one row of scan line), Dual Gate (each row of pixel units is driven by two rows of scan lines), and Triple Gate (each row of pixel units is driven by three rows of scan lines). As shown in FIG. 1-FIG. 3, FIG. 1 shows a Single Gate pixel architecture provided in the related art, FIG. 2 shows a Dual Gate pixel architecture provided in the related art, and FIG. 3 shows a Triple Gate pixel architecture provided in the related art. G1, G2 . . . are scan lines, D1, D2 . . . are data lines, and each pixel unit includes a plurality of sub-pixels of different display colors (e.g., R, G, and B). At the same display panel resolution, different pixel architectures require different numbers of data driver ICs (integrated circuits), which in turn affects the production cost of a display panel. Taking the resolution of the display panel being 1920*1080 as an example, i.e., there are 1920 columns of pixel units and 1080 rows of pixel units, and the number of sub-pixels in a row direction is 1920*3=5760. Taking a single data driver IC driving 960 data lines as an example, 6 data driver ICs are required for the Single Gate pixel architecture, 3 data driver ICs are required for the Dual Gate pixel architecture, and 2 data driver ICs are required for the Triple Gate pixel architecture. But a reduction in the number of the data driver ICs comes at the cost of compressing the actual charging time of each pixel. Assuming that the actual charging time of each pixel is 1 H in the Single Gate pixel architecture, the actual charging time of each pixel is ½ H in the Dual Gate pixel architecture, and the actual charging time of each pixel is ⅓ H in the Triple Gate pixel architecture. For an ultra-large-sized high-resolution product, adopting a design of the Dual Gate or Triple Gate pixel architecture may reduce the cost of the data driver ICs, but cannot ensure a picture quality because the charging time of the pixels is too short.

Figure 4:
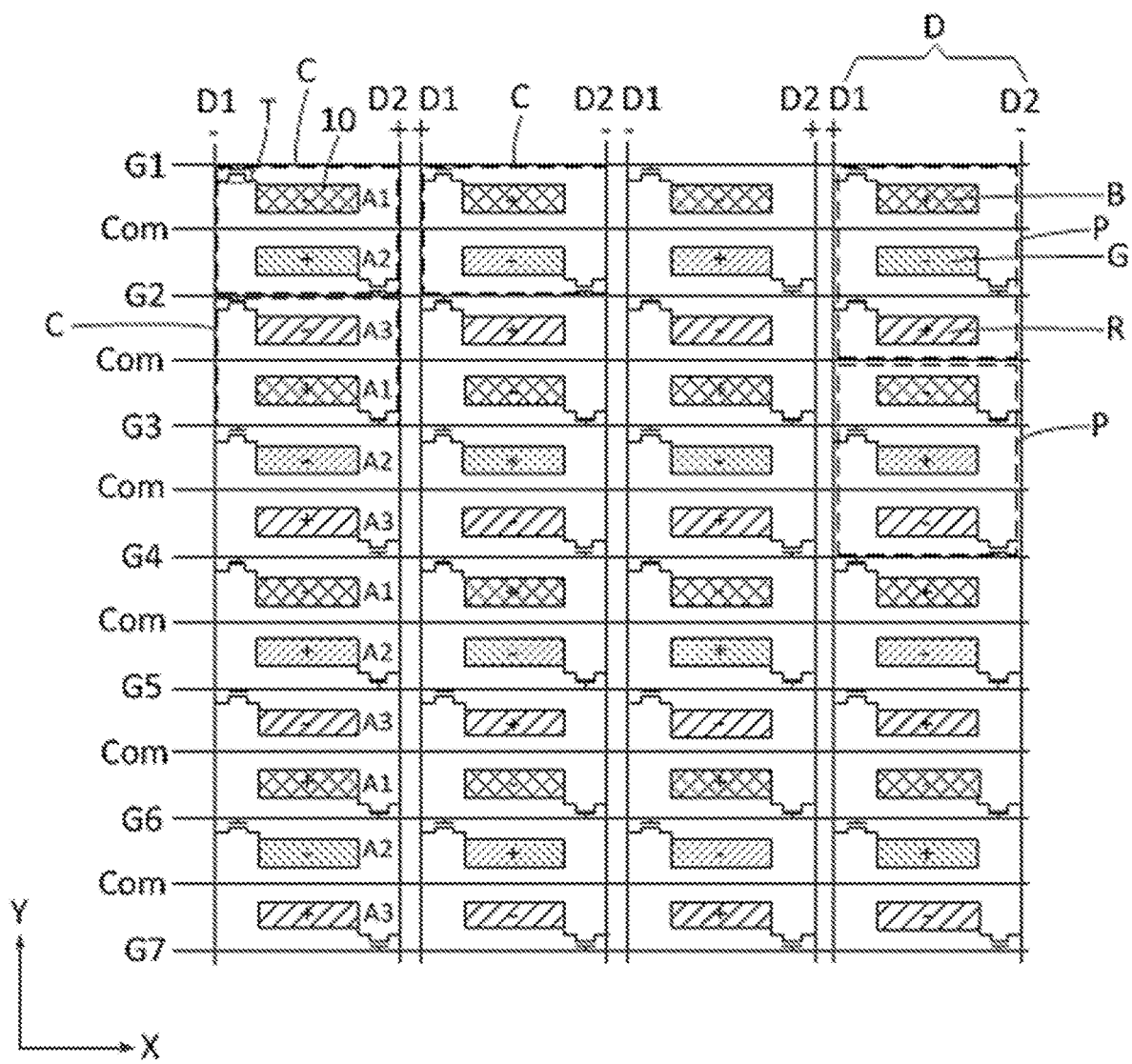
FIG. 4 is a schematic structural diagram of an array substrate provided by an embodiment of the present disclosure.
Figure 5:
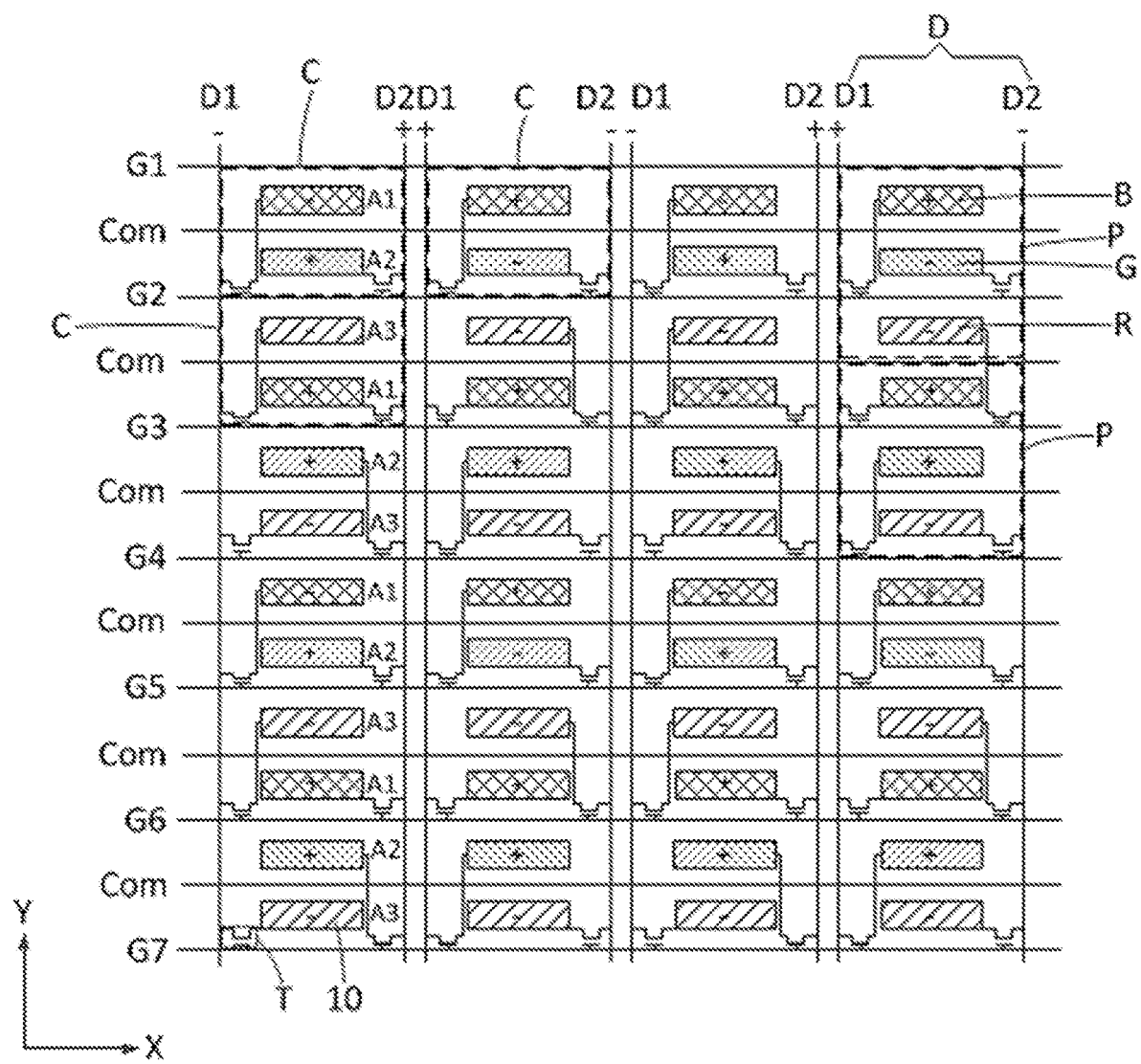
FIG. 5 is a schematic structural diagram of another array substrate provided by an embodiment of the present disclosure.
Figure 6:
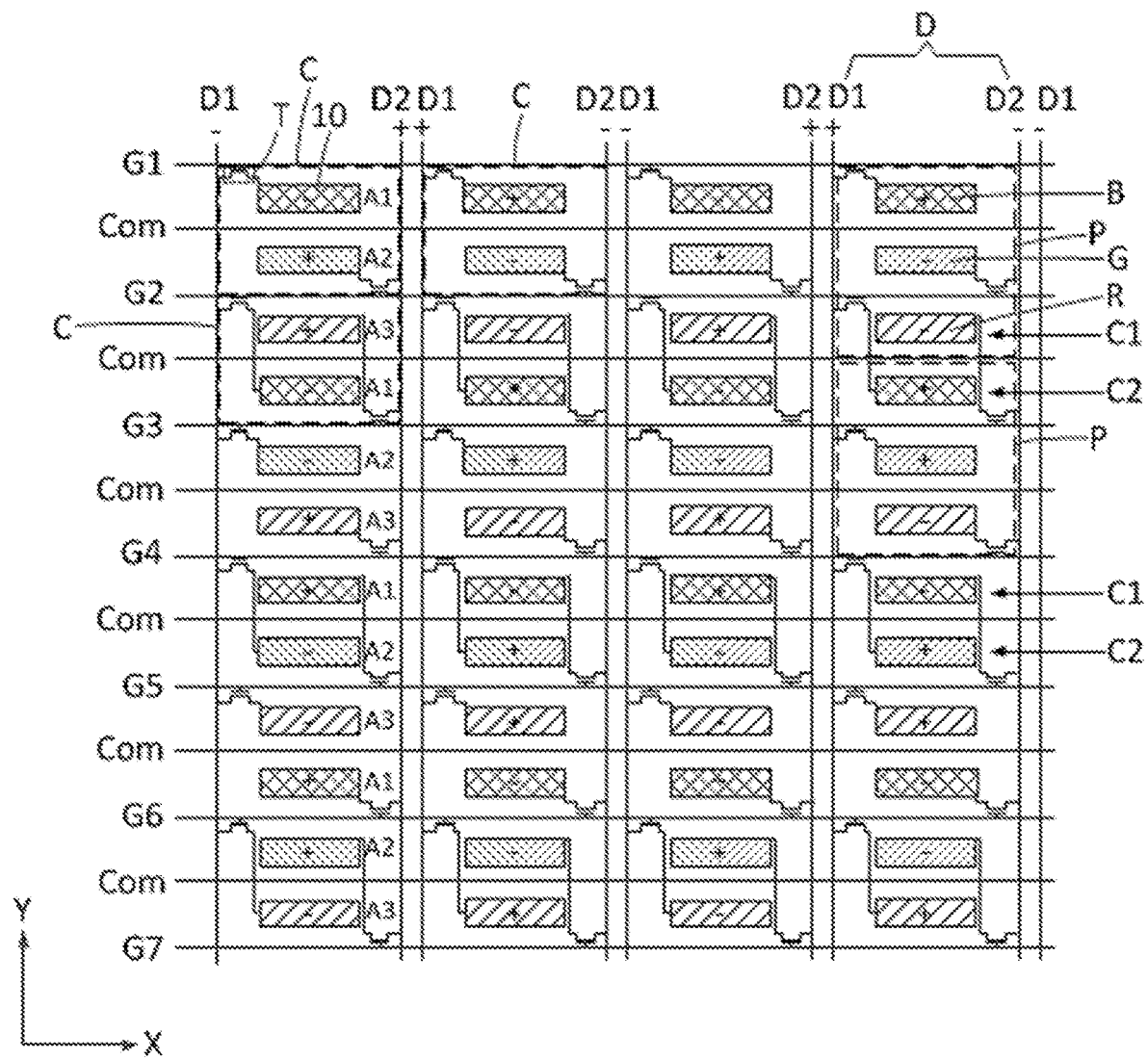
FIG. 6 is a schematic structural diagram of another array substrate provided by an embodiment of the present disclosure.

In order to solve the above technical problems, an embodiment of the present disclosure provides an array substrate, as shown in FIG. 4-FIG. 6, including:

a plurality of pixel groups C arranged in a row direction X and a column direction Y in an array mode, each pixel group C including two sub-pixels arranged in the column direction Y, each column of pixel groups C including a plurality of sub-pixels (A1, A2, and A3) of a plurality of display colors set alternately, and each sub-pixel located in the same row having the same display color; for example, in the column direction Y, one pixel group C may include two sub-pixels A1 and A2, one pixel group C may include two sub-pixels A3 and A1, and one pixel group C may include two sub-pixels A2 and A3; and in the row direction X, for example, the first row are all sub-pixels A1, the second row are all sub-pixels A2, the third row are all sub-pixels A3, and after that, A1, A2, and A3 are arranged sequentially and cyclically as one group;

a plurality of data line groups D, each data line group D including a first data line D1 and a second data line D2 extending in the column direction Y, each column of pixel groups C corresponding to one data line group D, and the first data line D1 and the second data line D2 in each data line group D being located on two opposite sides of each column of pixel groups C in the row direction X respectively; wherein the first data line D1 in each data line group D is electrically connected to one sub-pixel in each pixel group C of a corresponding column, and the second data line D2 in each data line group D is electrically connected to the other sub-pixel in each pixel group C of the corresponding column; and a plurality of rows of scan lines (G1, G2, G3 . . . ), each row of scan line (G1, G2, G3 . . . ) and each row of pixel groups C being arranged alternately in the column direction Y, and the scan lines (G1, G2, G3 . . . ) being electrically connected to the sub-pixels in corresponding rows.

According to the above array substrate provided by the embodiment of the present disclosure, a whole line of sub-pixels of the same color is designed in the row direction, sub-pixels of different colors are designed as a group in the column direction to be arranged sequentially and cyclically, a row of scan line is arranged every two rows of sub-pixels in the column direction, and two data lines are arranged between every two adjacent columns of sub-pixels in the row direction. Compared to the Single Gate pixel architecture in the related art, a pixel architecture of the present disclosure has 1.5 times the number of scan lines, ⅔ time the number of data driver ICs, and ⅔ time the charging time of Single Gate, so that the pixel architecture of the present disclosure may save the number of data driver ICs by ⅓ at the same resolution compared to Single Gate. Compared to the Dual Gate pixel architecture in the related art, the pixel architecture of the present disclosure has ¾ time the number of scan lines, 4/3 times the number of data driver ICs, and 4/3 times the charging time of Dual Gate, so that the pixel architecture of the present disclosure may increase the charging time of each row of pixels by ⅓ at the same resolution compared to Dual Gate. Thus, the array substrate provided by the embodiment of the present disclosure may be used in some ultra-large high-resolution display panels, which may reduce the cost of the data driver ICs and also ensure the charging time of the pixels, so that a picture quality may be ensured.

Optionally, the array substrate provided by the embodiment of the present disclosure may be applied to a liquid crystal display product and is certainly not limited thereto.

In a specific implementation, in the above array substrate provided by the embodiment of the present disclosure, as shown in FIG. 4-FIG. 6, one sub-pixel in one of any two adjacent pixel groups C in the column direction Y has the same display color as one sub-pixel in the other group. For example, taking the first column of pixel group C as an example, wherein the sub-pixel A1 in the first pixel group C and the sub-pixel A1 in the second pixel group C have the same display color, the sub-pixel A3 in the second pixel group C and the sub-pixel A3 in the third pixel group C have the same display color, and the sub-pixel A2 in the third pixel group C and the sub-pixel A2 in the fourth pixel group C have the same display color. Any two adjacent sub-pixels in the column direction Y have different display colors.

In a specific implementation, in the above array substrate provided by the embodiment of the present disclosure, as shown in FIG. 4-FIG. 6, each column of sub-pixels is divided into a plurality of pixel units P sequentially arranged in the column direction Y. Each pixel unit P includes a first sub-pixel A1, a second sub-pixel A2, and a third sub-pixel A3 sequentially arranged in the column direction Y, i.e., each column of pixel groups includes first sub-pixels A1, second sub-pixels A2, and third sub-pixels A3 sequentially arranged in the column direction Y, wherein the first sub-pixels A1, the second sub-pixels A2, and the third sub-pixels A3 have different display colors. Optionally, the display color of the first sub-pixels A1 is blue (B), the display color of the second sub-pixels A2 is green (G), and the display color of the third sub-pixels A3 is red (R), i.e., the sub-pixels in the column direction are arranged in an order of BGRBGRBGR . . . , but are not limited to this. For example, the display color of the first sub-pixels A1 may also be red (R), the display color of the second sub-pixels A2 is green (G), and the display color of the third sub-pixel A3 is blue (B), i.e., the sub-pixels in the column direction are arranged in an order of RGBRGBRGB . . . . The display colors of the first sub-pixels A1, the second sub-pixels A2, and the third sub-pixels A3 may be set according to actual needs.

In a specific implementation, in the above array substrate provided by the embodiment of the present disclosure, as shown in FIG. 4-FIG. 6, a length of each sub-pixel in the row direction X is greater than a length of the same in the column direction Y. An arrangement of the sub-pixels of the present disclosure is that a whole line of sub-pixels of the same color is in the row direction X, and BGRBGR is arranged sequentially and cyclically in the column direction Y, so that the number of data driver ICs may be saved by ⅓ at the same resolution as compared to Single Gate, and the charging time of each row of pixels may be increased by ⅓ at the same resolution as compared to Dual Gate.

In a specific implementation, in the above array substrate provided by the embodiment of the present disclosure, as shown in FIG. 4-FIG. 6, each sub-pixel may include a pixel electrode 10 and a thin film transistor T. A gate of each transistor T is electrically connected to the corresponding scan line. A first electrode of each transistor T is electrically connected to the corresponding data line. A second electrode of each transistor T is electrically connected to the corresponding pixel electrode 10.

Optionally, the gate of each transistor T and the corresponding scan line are arranged integrally. The first electrode of each transistor T and the corresponding data line are arranged integrally. The second electrode of each transistor T is electrically connected to the corresponding pixel electrode in a localized contact mode.

Optionally, each transistor T may be a P-type transistor or an N-type transistor, and may be a bottom-gate type transistor, a top-gate type transistor, or a double-gate type transistor, etc., without limitation here. In the present disclosure, the first electrode of each transistor T may be a source, and the second electrode is a drain. Alternatively, the first electrode of each transistor T is a drain, and the second electrode is a source, without limitation here. Each transistor T further includes an active layer, and a material of the active layer may be amorphous silicon (a-Si), polycrystalline silicon (poly), an oxide (e.g., an indium gallium zinc oxide, IGZO), etc. Optionally, a gate insulating layer (GI) may be arranged between a layer where the gate of each transistor T is located and the active layer, and a material of the gate insulating layer may be at least one of inorganic insulating materials, such as silicon oxide, silicon nitride, or silicon oxynitride.

Optionally, a material of each pixel electrode includes a transparent conductive material such as indium tin oxide (ITO), and indium zinc oxide (IZO).

Optionally, a material of each scan line may include a metal such as molybdenum (Mo), aluminum (Al), titanium (Ti), chromium (Cr), and nickel (Ni), and the scan line may be of a single-layer structure or a stacked-layer structure, e.g., the scan line is of the single-layer structure consisting of a molybdenum metal layer.

Optionally, a material of each data line may include a metal such as molybdenum (Mo), aluminum (Al), titanium (Ti), chromium (Cr), and nickel (Ni), and the data line may be of a single-layer structure or a stacked-layer structure, e.g., the data line is of the stacked-layer structure consisting of a titanium metal layer/aluminum metal layer/titanium metal layer.

In a specific implementation, in the above array substrate provided by the embodiment of the present disclosure, as shown in FIG. 4, each row of sub-pixels is electrically connected to the scan line most adjacent thereto. A scan line is arranged every two rows of sub-pixels in the column direction Y. For example, the first row of scan line G1 is electrically connected to the first row of sub-pixels, the second row of scan line G2 is electrically connected to the second row of sub-pixels and the third row of sub-pixels, the third row of scan line G3 is electrically connected to the fourth row of sub-pixels and the fifth row of sub-pixels, and so on. Two adjacent data lines are arranged between every two adjacent columns of sub-pixels in the row direction X. The two adjacent data lines are, for example, D2 and D1 between the first column of pixel groups C and the second column of pixel groups C. D2 drives the even rows of sub-pixels on a left side thereof, and D1 drives the odd rows of sub-pixels on a right side thereof. Of course, it is also possible that D2 drives the odd rows of sub-pixels on the left side thereof, and D1 drives the even rows of sub-pixels on the right side thereof. A polarity arrangement of each data line in the row direction X may be "−++−−++−" or "+−−++−−+", and one data line does not switch a polarity within a frame, i.e., polarities of voltages loaded on the first data line D1 and the second data line D2 in each data line group D are opposite, and polarities of voltages loaded on the two columns of data lines (D1 and D2) between two adjacent columns of pixel groups C are the same. The pixel architecture design shown in FIG. 4 provided by the embodiment of the present disclosure may save the number of data driver ICs by ⅓ at the same resolution as compared to Single Gate, and may increase the charging time of each row of pixels by ⅓ at the same resolution as compared to Dual Gate.

Figure 7:
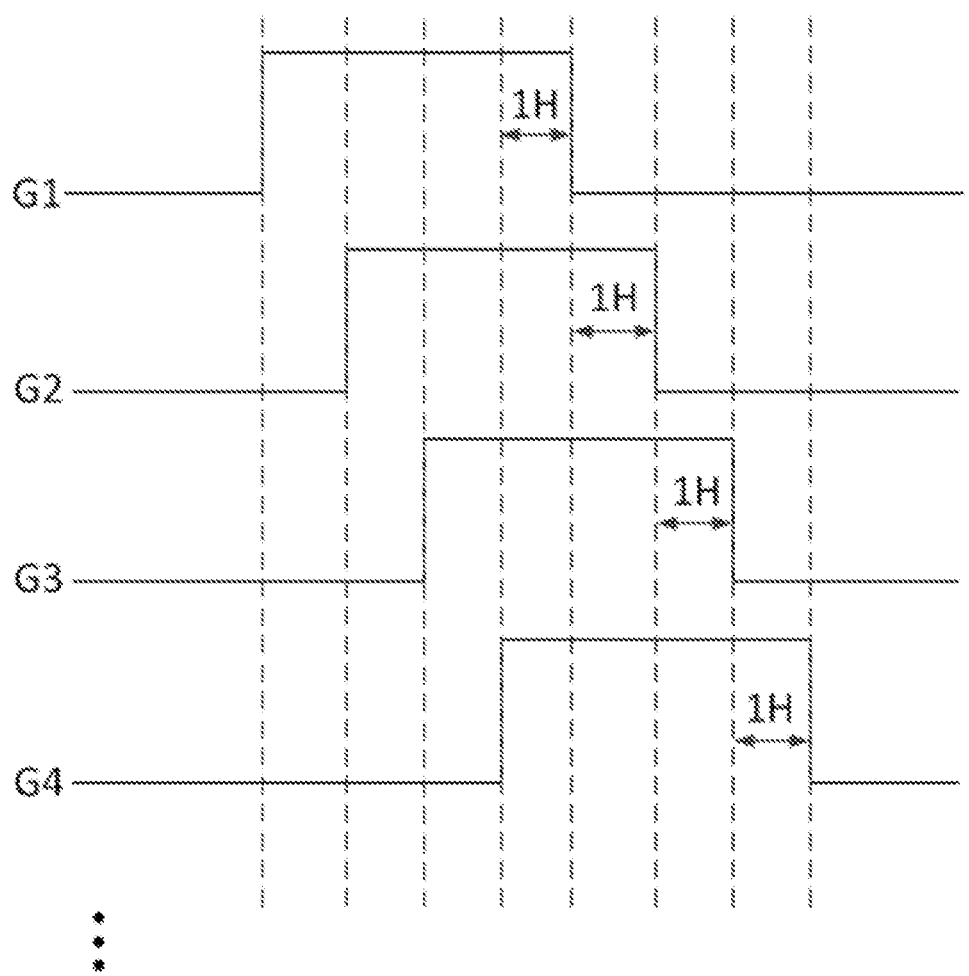
FIG. 7 is a timing diagram of the array substrate shown in FIG. 4.
Figure 8:
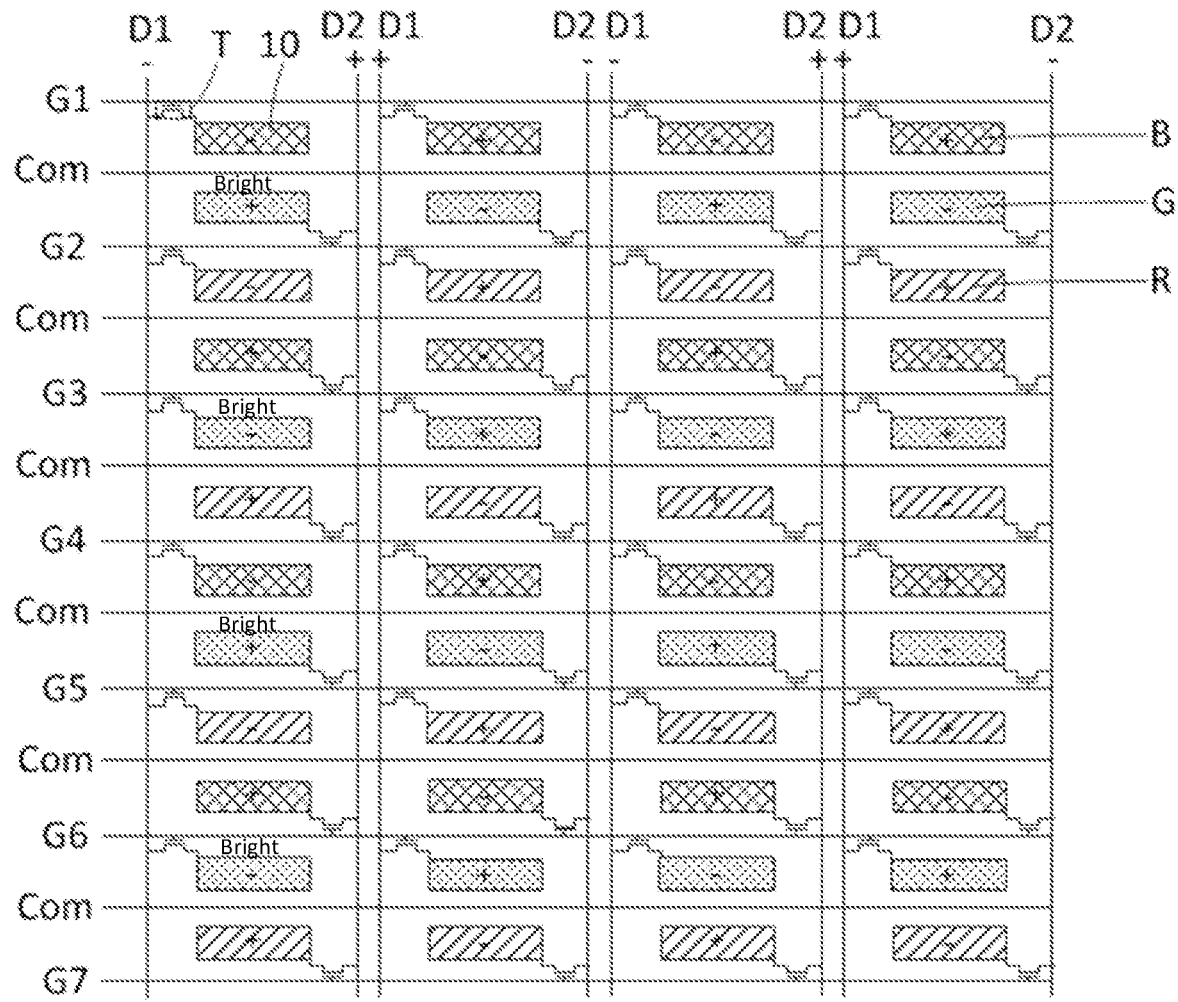
FIG. 8 is a schematic diagram of a brighter effect of green (G) sub-pixels in the array substrate shown in FIG. 4.

Based on the array substrate shown in FIG. 4, during a picture quality testing process, for example, the picture quality testing process of red-green (RG) mixing, all the green (G) sub-pixels are pre-charged, resulting in a long charging time, the red (R) sub-pixels are not pre-charged, resulting in a short charging time, so that the green (G) sub-pixels are all brighter, and the red (R) sub-pixels are darker, which makes a problem of a color deviation prone to occurring. For example, a high level of each row of scan line will last for 4 H. Of course, the high level of each row of scan line may also last for 2 H/3 H/5 H/6 H/7 H/8 H, etc. The present disclosure takes 4 H as an example. Combined with a timing diagram shown in FIG. 7, the last 1 H of high-level time of the scan line G1/G2/G3/G4 . . . is actual data charging time of the sub-pixels, and the first 3 H are all pre-charging time. Taking the third row of red (R) sub-pixels and the fifth row of green (G) sub-pixels as an example, since the same column of sub-pixels in these two rows is electrically connected to the same data line, the green (G) sub-pixels are pre-charged when the red (R) sub-pixels are being charged, thus the green (G) sub-pixels are brighter, and the red (R) sub-pixels are darker, as shown in FIG. 8, which is a schematic diagram of a brighter effect of the green (G) sub-pixels.

In order to solve the problem of the color deviation of the array substrate shown in FIG. 4 when testing a red-green (RG) mixed-color picture, an embodiment of the present disclosure provides another array substrate, as shown in FIG. 5. Each row of pixel groups C is electrically connected to the same row of scan line. Different rows of pixel groups C are electrically connected to different rows of scan lines. For example, two rows of sub-pixels of the first row of pixel groups C are all electrically connected to the second row of scan line G2, two rows of sub-pixels of the second row of pixel groups C are all electrically connected to the third row of scan line G3, and two rows of sub-pixels of the third row of pixel groups C are all electrically connected to the fourth row of scan line G4 . . . . Or of course, the two rows of sub-pixels of the first row of pixel groups C are all electrically connected to the first row of scan line G1, the two rows of sub-pixels of the second row of pixel groups C are all electrically connected to the second row of scan line G2, and the two rows of sub-pixels of the third row of pixel groups C are all electrically connected to the third row of scan line G3.

In a specific implementation, in the above array substrate provided by the embodiment of the present disclosure, as shown in FIG. 5, each first sub-pixel A1 in the pixel groups C located in an $M^{th}$ column is alternately electrically connected to the first data line D1 and the second data line D2 of the corresponding group, and each first sub-pixel A1 in the pixel groups C located in an $(M+1)^{th}$ column is electrically connected to the first data line D1 of the corresponding group, wherein M is a positive integer. For example, each first sub-pixel A1 in the pixel groups C located in the first column is alternately electrically connected to the first data line D1 and the second data line D2 of the corresponding group. Each first sub-pixel A1 in the pixel groups C located in the second column is electrically connected to the first data line D1 of the corresponding group. Each first sub-pixel A1 in the pixel groups C located in the third column is alternately electrically connected to the first data line D1 and the second data line D2 of the corresponding group. Each first sub-pixel A1 in the pixel groups C located in the fourth column is electrically connected to the first data line D1 of the corresponding group, and so on.

Each second sub-pixel A2 in the pixel groups C located in the $M^{th}$ column is electrically connected to the second data line D2 of the corresponding group, and each second sub-pixel A2 in the pixel groups C located in the $(M+1)^{th}$ column is alternately electrically connected to the second data line D2 and the first data line D1 of the corresponding group, M is a positive integer. For example, each second sub-pixel A2 in the pixel groups C located in the first column is electrically connected to the second data line D2 of the corresponding group. Each second sub-pixel A2 in the pixel groups C located in the second column is alternately electrically connected to the second data line D2 and the first data line D1 of the corresponding group. Each second sub-pixel A2 in the pixel groups C located in the third column is electrically connected to the second data line D2 of the corresponding group. Each second sub-pixel A2 in the pixel groups C located in the fourth column is alternately electrically connected to the second data line D2 and the first data line D1 of the corresponding group, and so on.

Each third sub-pixel A3 in the pixel groups C located in the $M^{th}$ column is electrically connected to the first data line D1 of the corresponding group, and each third sub-pixel A3 in the pixel groups C located in the $(M+1)^{th}$ column is electrically connected to the second data line D2 of the corresponding group, M is a positive integer. For example, each third sub-pixel A3 in the pixel groups C located in the first column is electrically connected to the first data line D1 of the corresponding group. Each third sub-pixel A3 in the pixel groups C located in the second column is electrically connected to the second data line D2 of the corresponding group. Each third sub-pixels A3 in the pixel groups C located in the third column is electrically connected to the first data line D1 of the corresponding group. Each third sub-pixel A3 in the pixel groups C located in the fourth column is electrically connected to the second data line D2 of the corresponding group, and so on.

Figure 9:
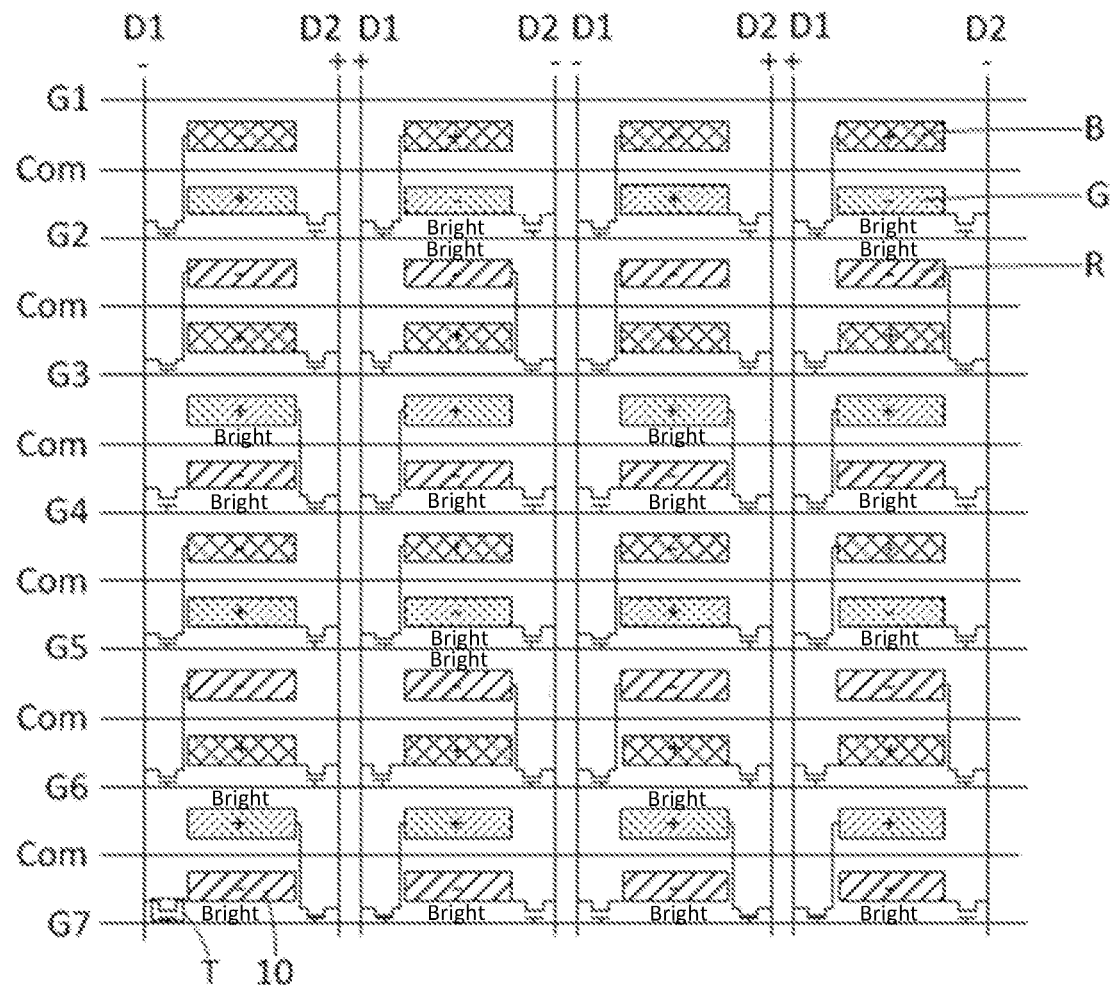
FIG. 9 is a schematic diagram of a brighter effect of red (R) sub-pixels and green (G) sub-pixels in the array substrate shown in FIG. 5.

An embodiment of the present disclosure provides the pixel architecture design shown in FIG. 5. During a picture quality testing process of red-green (RG) mixing, a next row of red (R) sub-pixels or green (G) sub-pixels is pre-charged when a previous row of red (R) sub-pixels is being charged, or a next row of green (G) sub-pixels or red (R) sub-pixels is pre-charged when a previous row of green (G) sub-pixels is being charged, so that half of the green (G) sub-pixels will be brighter, and ¾ of the red (R) sub-pixels will be brighter, as shown in FIG. 9, which is a schematic diagram of a brighter effect of red (R) sub-pixels and green (G) sub-pixels. Thus, after red-green (RG) mixing, a picture may be more uniform, and the problem of the color deviation of the picture is solved.

In a specific implementation, in order to further increase the charging time of each row of pixels of the array substrate provided by the embodiment of the present disclosure, in the above array substrate provided by the embodiment of the present disclosure, as shown in FIG. 6, each sub-row of sub-pixels in the pixel groups C located in an $N^{th}$ row is electrically connected to the scan line most adjacent thereto, the pixel groups C located in an $(N+1)^{th}$ row include a first sub-row (C1) of sub-pixels and a second sub-row (C2) of sub-pixels, the first sub-row (C1) of sub-pixels is electrically connected to the scan line most adjacent to the second sub-row (C2) of sub-pixels, and the second sub-row (C2) of sub-pixels is electrically connected to the scan line most adjacent to the first sub-row (C1) of sub-pixels, wherein N is a positive integer. For example, the first sub-row of sub-pixels in the first row of pixel groups C is electrically connected to the first row of scan line G1 most adjacent thereto. The second sub-row of sub-pixels in the first row of pixel groups C is electrically connected to the second row of scan line G2 most adjacent thereto. The first sub-row (C1) of sub-pixels in the second row of pixel groups C is electrically connected to the third row of scan line G3 most adjacent to the second sub-row (C2) of sub-pixels. The second sub-row (C2) of sub-pixels in the second row of pixel groups C is electrically connected to the second row of scan line G2 most adjacent to the first sub-row (C1) of sub-pixels. The first sub-row of sub-pixels in the third row of pixel groups C is electrically connected to the third row of scan line G3 most adjacent thereto. The second sub-row of sub-pixels in the third row of pixel groups C is electrically connected to the fourth row of scan line G4 most adjacent thereto. The first sub-row (C1) of sub-pixels in the fourth row of pixel groups C is electrically connected to the fifth row of scan line G5 most adjacent to the second sub-row (C2) of sub-pixels. The second sub-row (C2) of sub-pixels in the fourth row of pixel groups C is electrically connected to the fourth row of scan line G4 most adjacent to the first sub-row (C1) of sub-pixels.

In a specific implementation, in the above array substrate provided by the embodiment of the present disclosure, as shown in FIG. 6, two most adjacent sub-pixels (G and R) located on two sides of the same scan line (e.g., G2) and in the same column (e.g., the first column) are connected to the same data line D2. Two most adjacent sub-pixels (B and G) located on two sides of the same scan line (e.g., G3) and in the same column (e.g., the second column) are connected to the same data line D1. Two most adjacent sub-pixels (R and B) located on two sides of the same scan line (e.g., G4) and in the same column (e.g., the third column) are connected to the same data line D2.

As shown in FIG. 6, for example, as for two adjacent data lines D2 and D1 between the first column of pixel groups C and the second column of pixel groups C, D2 drives pixels on the left side thereof in a driving order of one row of green sub-pixel, then two rows of red sub-pixels, then two rows of blue sub-pixels and then one row of green sub-pixel, and the cycle repeats. D1 drives pixels on the right side thereof in a driving order of two rows of blue sub-pixels, two rows of green sub-pixels, and two rows of red sub-pixels, and the cycle repeats. A polarity arrangement of each data line is "−++−−++−" or "+−−++−−+", and one data line does not switch a polarity within a frame. Every two adjacent sub-pixels connected to each column of data line of the pixel architecture shown in FIG. 6 are of the same color, e.g., the colors of the sub-pixels connected to the first column of data line D1 are BBGGRR . . . , the colors of the sub-pixels connected to the second column of data line D2 are GGRRBB . . . , and thus the pixel architecture shown in FIG. 6 may support simultaneous turning on gates of every two rows of sub-pixels, doubling the charging time of the pixels, thereby increasing a charging rate of each row of pixels. Taking the first column of data line D1 as an example, when G1 and G2 are turned on simultaneously, D1 charges two blue sub-pixels, which will not cause abnormalities in the picture.

As shown in Table 1 below, Table 1 shows comparison results of the numbers of scan lines, the numbers of data lines, the numbers of data driver ICs, and charging time of each row of pixels corresponding to a pixel architecture provided by an embodiment of the present disclosure and several common pixel architectures in the related art by taking a resolution of a display panel being 1920*1080 as an example.

TABLE 1

| Type of pixel architecture | | Single Gate | Dual Gate | Triple Gate | The present disclosure |
|---|---|---|---|---|---|
| 1920*1080 Resolution | Number of scan lines | 1080*1 | 1080*2 | 1080*3 | 1080*1.5 |
| | Number of data lines | 1920*3 | 1920*3/2 | 1920 | 1920*2 |
| | Number of data driver ICs (960 pin/IC) | 6 | 3 | 2 | 4 |
| 1 H (μs) @ 60 Hz | | 14.8 | 7.4 | 4.93 | 9.86 |

As may be seen from Table 1, the pixel architecture design of an array substrate provided by the embodiment of the present disclosure is compared to Single Gate and Dual Gate in the related art, the number of scan lines of the present disclosure is between that of Single Gate and that of Dual Gate, the number of data lines is between that of Single Gate and that of Dual Gate, the number of data driver ICs is between that of Single Gate and that of Dual Gate, and the charging time of each row of pixels is between that of Single Gate and that of Dual Gate. Thus, the pixel architecture design of the array substrate provided by the embodiment of the present disclosure may reduce the cost of the data driver ICs and also ensure the charging time of the pixels, so that the picture quality may be ensured.

In a specific implementation, the above array substrate provided by the embodiment of the present disclosure, as shown in FIG. 4-FIG. 6, further includes a plurality of rows of common electrode lines Com, and each row of common electrode line Com is located between two rows of sub-pixels of the corresponding row of pixel groups C. For example, the first row of common electrode line Com is located between two rows of sub-pixels of the first row of pixel groups C, the second row of common electrode line Com is located between two rows of sub-pixels of the second row of pixel groups C, and the third row of common electrode line Com is located between two rows of sub-pixels of the third row of pixel groups C . . . . Specifically, the common electrode lines Com and the scan lines (G1, G2, G3 . . . ) are arranged alternately in the column direction Y. In this way, arranging the plurality of common electrode lines Com within the whole array substrate may ensure the uniformity of common signals so as to improve the display uniformity.

It needs to be noted that other essential components in the array substrate shall be understood by those of ordinary skill in the art, which are omitted here and also shall not be used as a limitation to the present disclosure.

Based on the same inventive concept, an embodiment of the present disclosure further provides a driving method of an array substrate, used for driving the above array substrate provided by the embodiment of the present disclosure. The driving method includes:

loading scan voltages to scan lines within time of one frame, and loading data voltages to a corresponding row of sub-pixels through a data line group; wherein polarities of voltages loaded on a first data line and a second data line in each data line group are opposite, and polarities of voltages loaded on two columns of data lines between two adjacent columns of pixel groups are the same.

A specific driving principle may refer to the relevant description in the foregoing array substrate, and will not be described in detail here.

In a specific implementation, in the above driving method provided by the embodiment of the present disclosure, as shown in FIG. 4 and FIG. 5, scan voltages are loaded to the scan lines row by row within the time of one frame. As shown in FIG. 6, scan voltages are loaded to two adjacent rows of scan lines simultaneously so as to increase a charging rate of each row of pixels.

In a specific implementation, the above array substrate provided by the embodiment of the present disclosure may further include other functional film layers known to those of skill in the art, which are not enumerated here.

Figure 10:
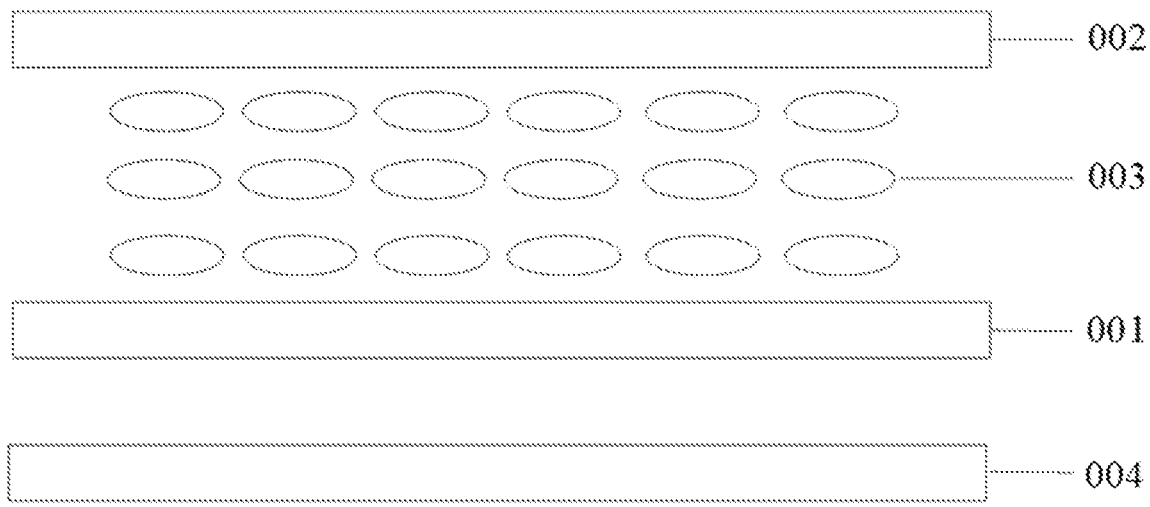
FIG. 10 is a schematic structural diagram of a display apparatus provided by an embodiment of the present disclosure.

Based on the same inventive concept, an embodiment of the present disclosure further provides a display panel, as shown in FIG. 10, including: the above array substrate 001 provided by the embodiment of the present disclosure, and an opposite substrate 002 aligned with the array substrate 001. The principle for solving problems of the display panel is similar to that of the aforementioned array substrate, thus the implementation of the display panel may refer to the implementation of the aforementioned array substrate, and repetitions are omitted here.

In a specific implementation, the above display panel provided by the embodiment of the present disclosure, as shown in FIG. 10, further includes: a liquid crystal layer 003 located between the array substrate 001 and the opposite substrate 002, and a backlight module 004 located on a light-in side of the array substrate 001.

Specifically, the opposite substrate includes: a blue color film arranged in correspondence with a first sub-pixel, a green color film arranged in correspondence with a second sub-pixel, and a red color film arranged in correspondence with a third sub-pixel.

In some embodiments, in the above display panel provided by the embodiment of the present disclosure, the backlight module 004 may be a straight-down backlight module or a side-entry backlight module. Optionally, the side-entry backlight module may include a light bar, stacked reflector plates, a light guide plate, a diffusion sheet, a prism group, etc., and the light bar is located on one side of the light guide plate in a thickness direction. The straight-down backlight module may include a matrix light source, reflector plates stacked on a light-out side of the matrix light source, a diffusion plate, a brightness enhancement film, etc., and the reflector plates include openings directly facing positions of all lamp beads in the matrix light source. Lamp beads in the light bar and the lamp beads in the matrix light source may be light-emitting diodes, LEDs, such as miniature light-emitting diodes (Mini LEDs, Micro LEDs, etc.).

Miniature light-emitting diodes on a sub-millimeter scale or even on a micrometer scale and an organic light-emitting diode (OLED) are self-luminous devices. Like the organic light-emitting diode, the miniature light-emitting diodes have a series of advantages such as high brightness, ultra-low latency, and ultra-large viewing angle. In addition, an inorganic light-emitting diode realizes light emitting based on a metal semiconductor with more stable properties and lower resistance, thereby having advantages of lower power consumption, higher resistance to high temperature and low temperature, and longer service life compared to the organic light-emitting diode that realizes light emitting based on organic matter. When the miniature light-emitting diodes are used as a backlight source, a more precise dynamic backlight effect can be realized, which can solve a glare phenomenon caused by traditional dynamic backlight between bright and dark areas of a screen while effectively improving the screen brightness and contrast, optimizing the visual experience.

Based on the same inventive concept, an embodiment of the present disclosure further provides a display apparatus, including the above display panel provided by the embodiment of the present disclosure. The principle for solving problems of the display apparatus is similar to that of the aforementioned display panel, and thus the implementation of the display apparatus may refer to the implementation of the aforementioned display panel, and repetitions are omitted here.

In a specific implementation, the above display apparatus provided by the embodiment of the present disclosure may be a liquid crystal display apparatus. The liquid crystal display apparatus further includes other necessary parts and compositions, such as a casing, a main circuit board, a power cord, etc., which may be supplemented accordingly by those of skill in the art according to the specific requirements for use of the display apparatus, will not be repeated here, and shall not be used as a limitation on the present disclosure.

In a specific implementation, the above display apparatus provided by the embodiment of the present disclosure may be a full-screen display apparatus, or may also be a flexible display apparatus, etc., which is not limited here.

Figure 11:
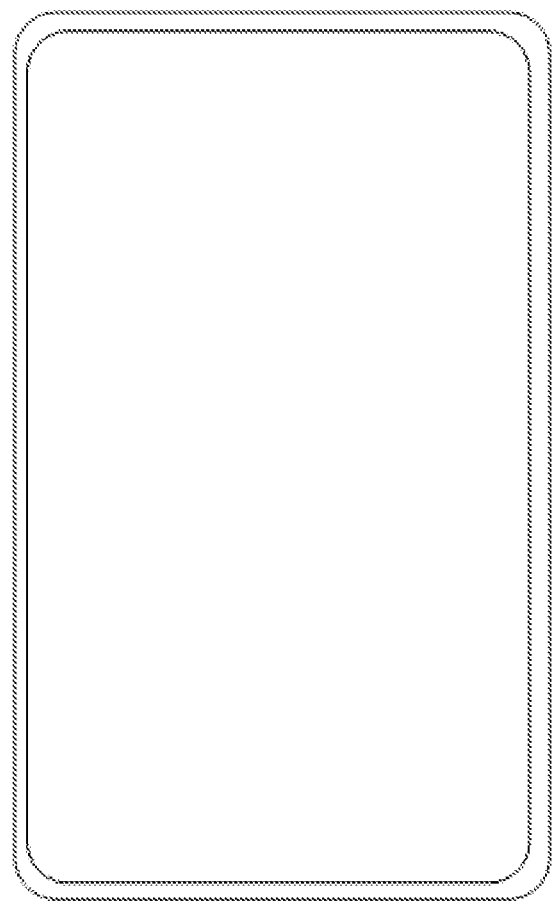
FIG. 11 is a schematic plan view of a display apparatus provided by an embodiment of the present disclosure.

In a specific implementation, the above display apparatus provided by the embodiment of the present disclosure may be a full-screen cell phone shown in FIG. 11. Of course, the above display apparatus provided by the embodiment of the present disclosure may also be a tablet computer, a television, a display, a laptop, a digital photo frame, a navigator, and any other products or parts with display functions.

The embodiments of the present disclosure provide the array substrate, the driving method thereof, the display panel, and the display apparatus. According to the above array substrate provided by the embodiment of the present disclosure, a whole line of sub-pixels of the same color is designed in the row direction, sub-pixels of different colors are designed as a group in the column direction to be arranged sequentially and cyclically, a row of scan line is arranged every two rows of sub-pixels in the column direction, and two data lines are arranged between every two adjacent columns of sub-pixels in the row direction. Compared to the Single Gate pixel architecture in the related art, a pixel architecture of the present disclosure has 1.5 times the number of scan lines, ⅔ time the number of data driver ICs, and ⅔ time the charging time of Single Gate, so that the pixel architecture of the present disclosure may save the number of data driver ICs by ⅓ at the same resolution compared to Single Gate. Compared to the Dual Gate pixel architecture in the related art, the pixel architecture of the present disclosure has ¾ time the number of scan lines, 4/3 times the number of data driver ICs, and 4/3 times the charging time of Dual Gate, so that the pixel architecture of the present disclosure may increase the charging time of each row of pixels by ⅓ at the same resolution compared to Dual Gate. Thus, the array substrate provided by the embodiment of the present disclosure may be used in some ultra-large high-resolution display panels, which may reduce the cost of the data driver ICs and also ensure the charging time of the pixels, so that the picture quality may be ensured.

Although the preferred embodiments of the present disclosure have been described, those of skill in the art may make additional changes and modifications on these embodiments once they know the basic creative concept. So the appended claims are intended to be construed as including the preferred embodiments and all changes and modifications that fall into the scope of the present disclosure.

Apparently, those of skill in the art may make various alterations and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. An array substrate, comprising:
a plurality of pixel groups arranged in a row direction and a column direction in an array mode, each pixel group comprising two sub-pixels arranged in the column direction, each column of pixel groups comprising a plurality of sub-pixels of a plurality of display colors arranged alternately, and each sub-pixel located in a same row comprising a same display color;
a plurality of data line groups, each data line group comprising a first data line and a second data line extending in the column direction, each column of pixel groups corresponding to one data line group, and the first data line and the second data line in each data line group being located on two opposite sides of each column of pixel groups in the row direction respectively; wherein the first data line in each data line group is electrically connected to one sub-pixel in each pixel group of a corresponding column, and the second data line in each data line group is electrically connected to the other sub-pixel in each pixel group of the corresponding column; and
a plurality of rows of scan lines, each row of scan line and each row of pixel groups being arranged alternately in the column direction, and the scan lines being electrically connected to the sub-pixels in corresponding rows;

wherein each sub-row of sub-pixels in the pixel groups located in an Nth row is electrically connected to the scan line most adjacent thereto, the pixel groups located in an (N+1)th row comprise a first sub-row of sub-pixels and a second sub-row of sub-pixels, the first sub-row of sub-pixels is electrically connected to the scan line most adjacent to the second sub-row of sub-pixels, and the second sub-row of sub-pixels is electrically connected to the scan line most adjacent to the first sub-row of sub-pixels; wherein N is a positive integer.

2. The array substrate according to claim 1, wherein each row of sub-pixels is electrically connected to the scan line most adjacent thereto.

3. The array substrate according to claim 1, wherein two most adjacent sub-pixels located on two sides of the same scan line and in the same column are connected to the same data line.

4. The array substrate according to claim 1, wherein each row of pixel groups is electrically connected to the same row of scan line, and different rows of pixel groups are electrically connected to different rows of scan lines.

5. The array substrate according to claim 4, wherein each column of pixel groups comprises first sub-pixels, second sub-pixels, and third sub-pixels sequentially arranged in the column direction, a display color of the first sub-pixels is blue, a display color of the second sub-pixels is green, and a display color of the third sub-pixels is red; wherein each first sub-pixel in the pixel groups located in an Mth column is alternately electrically connected to the first data line and the second data line of the corresponding group, and each first sub-pixel in the pixel groups located in an (M+1)th column is electrically connected to the first data line of the corresponding group;

each second sub-pixel in the pixel groups located in the Mth column is electrically connected to the second data line of the corresponding group, and each second sub-pixel in the pixel groups located in the (M+1)th column is alternately electrically connected to the second data line and the first data line of the corresponding group; and each third sub-pixel in the pixel groups located in the Mth column is electrically connected to the first data line of the corresponding group, and each third sub-pixel in the pixel groups located in the (M+1)th column is electrically connected to the second data line of the corresponding group; wherein M is a positive integer.

6. The array substrate according to claim 1, further comprising a plurality of rows of common electrode lines, each row of common electrode line being located between two rows of sub-pixels of a corresponding row of pixel groups.

7. The array substrate according to claim 6, wherein the common electrode lines and the scan lines are arranged alternately in the column direction.

8. The array substrate according to claim 1, wherein one sub-pixel in one of any two adjacent pixel groups in the column direction comprises the same display color as one sub-pixel in the other pixel group, and any two adjacent sub-pixels in the column direction comprise different display colors.

9. The array substrate according to claim 8, wherein each column of sub-pixels is divided into a plurality of pixel units sequentially arranged in the column direction, and each pixel unit comprises a first sub-pixel, a second sub-pixel, and a third sub-pixel sequentially arranged in the column direction; and the first sub-pixels, the second sub-pixels, and the third sub-pixels comprise different display colors.

10. The array substrate according to claim 9, wherein a display color of the first sub-pixels is blue, a display color of the second sub-pixels is green, and a display color of the third sub-pixels is red.

11. The array substrate according to claim 1, wherein a length of each sub-pixel in the row direction is greater than a length of the same in the column direction.

12. The array substrate according to claim 1, wherein each sub-pixel comprises a pixel electrode and a thin film transistor, a gate of the transistor is electrically connected to the corresponding scan line, a first electrode of the transistor is electrically connected to the corresponding data line, and a second electrode of the transistor is electrically connected to the corresponding pixel electrode.

13. A display panel, comprising the array substrate according to claim 1, and an opposite substrate aligned with the array substrate.

14. A display apparatus, comprising the display panel according to claim 13.

15. A driving method of an array substrate, used for driving the array substrate according to claim 1, wherein the driving method comprises:

loading scan voltages to scan lines, and loading data voltages to a corresponding row of sub-pixels through a data line group, within time of one frame; wherein polarities of voltages loaded on a first data line and a second data line in each data line group are opposite, and polarities of voltages loaded on two columns of data lines between two adjacent columns of pixel groups are the same.

16. The driving method according to claim 15, wherein the scan voltages are loaded to the scan lines row by row within the time of one frame, or the scan voltages are loaded to two adjacent rows of scan lines simultaneously within the time of one frame.

* * * * *